Jan. 1, 1952

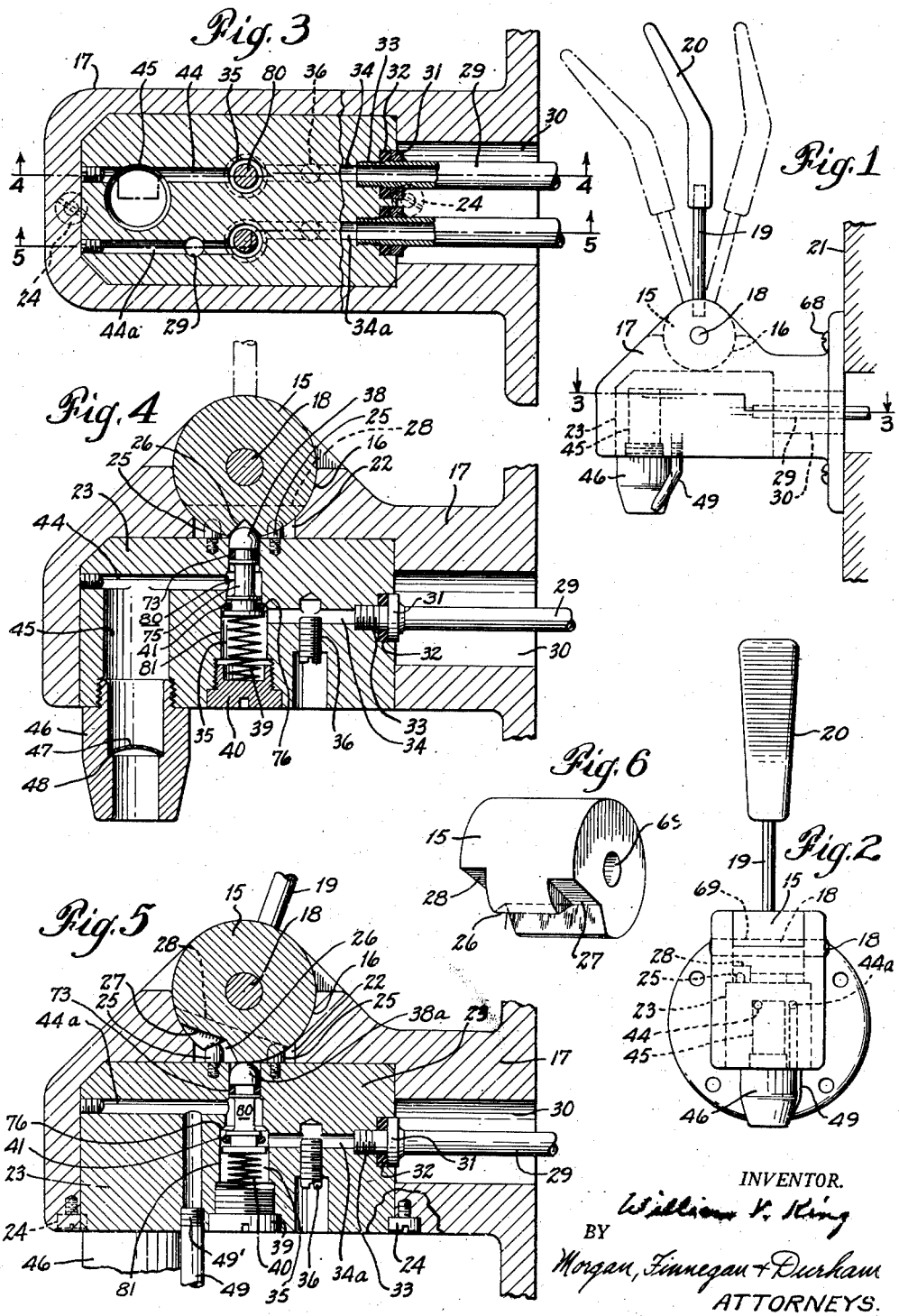

W. V. KING 2,580,553

BEVERAGE SPIGOT

Filed Sept. 20, 1948

INVENTOR.
William V. King
BY
Morgan, Finnegan & Durham
ATTORNEYS.

Patented Jan. 1, 1952

2,580,553

UNITED STATES PATENT OFFICE 2,580,553

BEVERAGE SPIGOT

William V. King, Brooklyn, N. Y., assignor to Spacarb, Inc., New York, N. Y., a corporation of Delaware Application September 20, 1948, Serial No. 50,045

5 Claims. (Cl. 277—3)

This invention relates to a device which controls the flow of liquid beverages and more particularly relates to a device which so controls the flow of liquids that either one of two liquids or a combination thereof may flow.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a side view of one embodiment of the subject invention, showing in particular the three positions of a manually operated lever and the relationship of the lever with respect to the other components of the subject spigot;

Fig. 2 is a front view of the subject spigot showing in particular the lever and the cam which it rotates;

Fig. 3 is a cross-scetional plan view of the embodiment of Fig. 1 taken across the line 3—3 of Fig. 1 and particularly shows the flow paths of the two liquids;

Fig. 4 is a cross-sectional side view taken across the line 4—4 of Fig. 3 and illustrating in further detail the components which control the flow of one of the liquids, said components being in their unoperated position;

Fig. 5 is a cross-sectional side view taken across the line 5—5 of Fig. 3 and shows in further detail the components which control the flow of the second liquid after the components have been moved into operating position such that the liquid can now be dispensed;

Fig. 6 is a perspective view of the three-positional cam shown in the previous figures, such cam determining whether any liquid will flow and if so whether the first liquid or a combination of the two liquids will flow;

Figure 7:
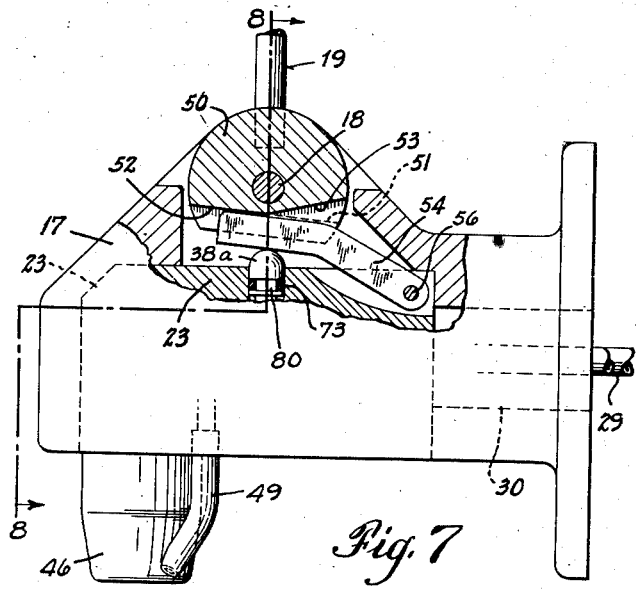
Fig. 7 is a side view partly in crcss-section of a second embodiment of the subject invention showing in particular a different cam and cam-operated components from that illustrated in the previous figures.

An object of the present invention is to provide a manually operated spigot which will dispense a liquid beverage such as carbonated water or a combination of carbonated water and a second liquid, such as a liquid flavor.

Another object of the present invention is to provide a manually operated spigot which will prevent the flow of either carbonated water or of the liquid flavor in its normal position.

Still another object of the subject invention is to provide an apparatus which will permit only the flow of carbonated water and at the same time prevent the flow of any liquid flavor when so desired.

A further object of the subject invention is to provide a device which will permit the flow of both carbonated water and a liquid flavor at appropriate times.

A still further object of the subject invention is to provide a three-positional manually operated spigot which will prevent the flow of either carbonated water or of a liquid flavor in its normal position; which will allow the flow of only carbonated water when a cam controlling the operation of the spigot is rotated in one direction; and which will allow the flow of both carbonated water and a liquid flavor when the said cam is rotated in the opposite direction.

Still another object of this invention is to provide cam structures which will so operate upon plungers controlling the flow of carbonated water and liquid flavor that either no liquid will flow or else only carbonated water will flow, or as a third possibility, both carbonated water and a liquid flavor will flow.

A further object of the subject invention is to provide a three-positional manually operated spigot which can be inexpensively manufactured and which at the same time can be easily and efficiently operated.

Still another object of this invention is to provide a three-positional manually operated spigot which can be operated with a minimum amount of thought and effort on the part of the dispenser operator.

The subject invention provides an apparatus which controls the flow both of a carbonated beverage and of a liquid flavor. A rotatable cam is provided which in its normal resting position prevents either the carbonated beverage or the liquid flavor from flowing. When the cam is rotated in one direction by pressing against a lever attached to the cam, only the carbonated beverage will flow. If, however, the cam is rotated in the opposite direction, both the carbonated water and the liquid flavor will flow into the cup. Various types of cams are shown such that the rotation can occur in either a horizontal or in a vertical plane.

Rotation of the cam operates plungers which are located below the cam. These plungers in their normal position stop up a system of cylindrical holes which extend throughout the length of the spigot and through which the carbonated water and the liquid flavor flow. Upon rotation of the cam, however, either one or both of the plungers are depressed depending upon whether carbonated water or liquid flavor in addition to the water is desired. Depression of the plunger also causes a sealing ring comprising a part of the plunger to be depressed. This ring is of such diameter that it will seat on a shoulder formed in the chamber housing the plunger so as to normally prevent liquid from flowing through the chamber. When, however, the plunger is depressed, the ring drops below the shoulder or valve seat of the chamber which interconnects the cylindrical holes, permitting the liquid to flow from the holes in the inlet side upward through the plunger chamber into outlet facilities on the opposite side of the chamber from the inlet holes; from the outlet facilities, the liquid flows into a cup positioned below these facilities. A spring member opposes the downward force exerted by the cam upon the plunger and returns the plunger to its normally closed position when the cam is returned to its normal position. The spring is positioned between the bottom of the plunger and the top of a threaded plug.

The various components of the subject spigot can be easily and quickly removed and thus can be kept clean with a minimum of effort. Thus, since the cam and lever assembly are secured to the spigot housing by a pivot pin which extends through concentric holes in the cam and spigot housing, the assembly can be removed merely by removing the pin and lifting the assembly away from the housing. Furthermore, the plungers and the outlet nozzles serving as the means for directing the liquid into the cup are located in a block which is fastened to the spigot housing by several studs easily accessible at the bottom of the block. Each plunger can be removed by detaching the threaded plug previously mentioned as lying below the plunger and the intermediate spring, and each outlet nozzle can be removed merely by unscrewing it from its socket.

The illustrative embodiment of the invention herein shown and described by way of example is adapted for use at soda fountains or any place where beverages are manually dispensed.

It will be understood that the foregoing general description and the following detailed description as well are exemplary and explanatory of the invention but are not restrictive thereof.

Referring now in detail to the drawings herein, one embodiment of the invention is shown in Figs. 1 through 6 inclusive. A spigot housing 17 is attached by means of bolts 68 to the walls 21 of a soda fountain or of any other device convenient to the dispensation of beverage refreshments. A cam 15 having, in general, a cylindrical shape and extending across the spigot fits into a socket 16 in the spigot housing 17. The socket 16 has a semi-cylindrical shape with a radius such that the cam fits snugly into the socket. A pivot pin 18 also serves as a removable means for holding the cam in position in the socket and extends through a cylindrical hole 69 in the cam and corresponding holes in the spigot housing. A lever 19 having a handle 20 is fastened to the top of the cam and it is this lever which is rotated when either carbonated water or carbonated water plus liquid flavor is desired.

The bottom of the generally semi-cylindrical socket 16 has portions cut away so as to form a hollow rectangular space 22 at the bottom of the socket. The spigot housing 17 also has a large hole, in general of rectangular shape at its bottom and it is into this rectangular hole that a block 23 fits. Threaded holes are located in the housing 17 near the block 23 and studs 24 fit into these holes. The studs have heads, part of which fit into a recess in the housing and the other part into a recess in the block 23, thus serving as means for holding the block in place in the rectangular recess at the bottom of the housing 17.

As has been previously stated, the cam 15 has, in general, a cylindrical shape, but as may be seen from Fig. 6, the bottom of the cylinder has a plurality of notches of different shape. Thus, an inverted V-shaped notch 26 is cut into the bottom of the cylinder and extends axially along the central portion of the cylinder. The notch is expanded at the right end of the cam as shown in Fig. 6 so that one leg of the V is rotated so as to provide a considerably greater included angle than that of the adjacent notch 26; thus a notch 27 is formed in the shape of an expanded and inverted V. At the left end of cam 15 a ledge 28 is provided which lies in a horizontal plane when cam 15 is in its normal position in the spigot. The central V-portion 26 controls the flow of the carbonated water and in its normal position prevents the flow of the water. When the cam is rotated to either side, the notch 26 causes a plunger, hereinafter to be described, to be depressed and permits carbonated water to flow. The expanded V-shaped notch 27 controls the flow of the liquid flavor. Rotation of the cam in a counterclockwise direction will not result in a flow of the liquid because of the fact that the notch is expanded in this direction. Rotation in a clockwise direction, however, causes liquid to flow. Stop pins 25 extend upwardly into space 22 and are threadedly secured in spaced relation in the top face of block 23. These stop pins 25 prevent further rotation of the cam after it has rotated to a certain degree in either direction.

As shown in Fig. 3, separate conduits and control mechanisms are provided for the flow of the carbonated water and the liquid beverage. Fig. 4 shows the mechanism which controls the flow of the carbonated water and Fig. 5 the mechanisms controlling the flow of the liquid flavor. The mechanisms shown in Fig. 4 are similar to those shown in Fig. 5 and an explanation of the former should be sufficient to give a satisfactory understanding of the workings of the latter. As shown in Fig. 4, the water enters the spigot through an inlet tube 29 which extends through a large hole 30 located at one end of the spigot housing 17. A collar 31 fits over the outer surface of the tube 29 at the point where the tube meets the walls of the block 23, part of the collar being located in the rectangular hole 30 and part extending into the side of the block 23. The collar is soldered to the inlet tube 29. A sealing ring 32 also surrounds the tube 29 and lies flush against the collar 31 on the side of the collar that is within the block. The tube 29 extends into the block 23 to a point interior to the ring 32 and is threaded therein. A hole 34 having a diameter substantially that of the inside of tube 29 serves as a further conduit for the flow of the carbonated water. At its other end this hole meets a valve chamber 35 which houses the plunger mechanism hereinafter to be described. An adjustable screw 36 extends upward into the hole 34 from a recess at the bottom of the block so as to partially plug the hole and thus control the amount of liquid that can flow therethrough.

A valve plunger 80 is located in the valve chamber 35 and is provided with a head 38, the rounded top of which fits into the V-shaped notch 26 when the cam 15 is in its normal resting position. A sealing ring 73 is inset into the chamber below the head 38 and has a normal outer diameter slightly less than that part of the chamber in which it rides, thus preventing any liquid from flowing upward into the socket. A reduced diameter portion 75 is located below the sealing ring and it is in the space between this portion and the walls of the chamber that liquid flows when the plunger 80 is depressed. At a point below the portion 75, the chamber 35 flares radially outwardly to form a circular compartment 81, the increased diameter of which is defined by a shoulder 76. A sealing ring 41 having a diameter somewhat less than that of the compartment 81 is normally pressed against this shoulder by the action of a spring 39, which lies below the ring and which normally urges the plunger towards cam 15. The spring is interposed between a collar located below the ring and a screw plug 40, the threaded portion of which fits into a threaded socket at the bottom of the block 23 and the head of which fits into a recess in the block.

As may be seen in Fig. 4, because of its contact with the shoulder 76, the ring 41 normally blocks the flow of liquid from the hole 34 upward through the chamber and into a second hole 44 positioned above the ring 41 and at the opposite side of the chamber from the hole 34. When the plunger is depressed, however, the ring drops away from the shoulder and the liquid is then able to flow through the chamber. Although the plunger in its depressed position permits liquid to flow downwardly as well as upwardly, the liquid collecting below the ring 41 is not harmful in any way to the subject apparatus.

As has been previously explained and as may be seen from Figs. 3, 4 and 5, the action of the plungers controlling the flow of the carbonated water and the liquid flavor are similar to each other. Fig. 4 shows the plunger mechanism controlling the flow of the carbonated water in its normal and unoperated position whereby the plunger blocks the flow of the water into the hole 44. Fig. 5 shows the plunger mechanism for the liquid flavor in its operated position such that liquid is able to flow into the hole 34a, corresponding to the hole 34 in Fig. 4, and then into the hole 44a, which corresponds to hole 44.

From the hole 44, the carbonated water flows into a head 45 and then into a nozzle member 46 having a circular screen element 47 which rests on a shoulder 48 of the nozzle 46. The structure and action of the cavity 44, the head 45 and the nozzle 46 are described in copending application, Serial No. 794,984, now Patent No. 2,551,699 issued May 8, 1951. In this application is also described the position of the outlet tube 49 relative to the nozzle member 46. The tube 49 serves as the conduit through which the outgoing stream of liquid flavor passes and is fastened to the block 23 by the threaded portion 49'. As may be best seen in Fig. 1, the position of the tube 49 is adjusted with respect to the nozzle 46 so that the carbonated water and the liquid flavor will mix before the liquids fall into the cup and while they are still traveling through the air.

Figure 8:
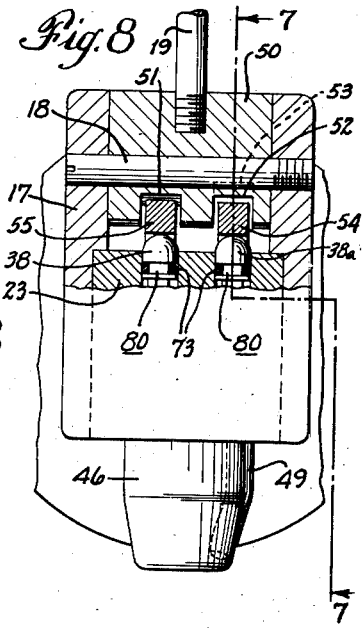
Fig. 8 is a front view, partly in cross-section, of the device shown in Fig. 7 and is taken across the line 8—8 of Fig. 7 and illustrates in further detail the cam and the cooperating components of Fig. 7.
Figure 9:
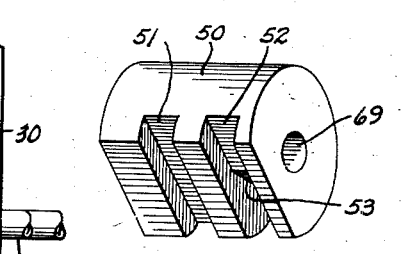
Fig. 9 is a perspective view of the cam shown in Figs. 7 and 8.

Referring now in detail to the embodiment of the invention shown in Figs. 7 through 9 inclusive, a different cam structure is shown than that which has just been described in connection with Figs. 1 through 6 inclusive. It should be realized, however, that although this cam structure is different it operates upon plungers similar to those previously described and causes the beverages to flow through liquid-containing structures such as previously described. A cam 50 having, in general, a cylindrical shape is flattened out at the bottom so that each cross section of the cam forms a segment of a circle. In addition, two notches 51 and 52 extend across the bottom of the cam; both have a generally rectangular shape, with their top and bottom edges forming parallel chords of a cross-sectional circle.

The notch 51 controls the flow of the carbonated water, while the position of the notch 52 determines whether or not the liquid flavor will flow. A deeper notch 53 extends from the end of the notch 52 to the side of the cam opposite the notch 52, with the additional space which distinguishes the notch 53 from the notch 52 comprising cross-sectional sectors of a circle. Thus, when the cam is rotated in a clockwise direction, as shown in Figs. 7 and 9, the plunger for the liquid flavor will not be operated because of the fact that the cam must rotate through the additional space before it contacts the notch 53.

Levers 55 and 54 are positioned between the cam 50 and their respective plunger mechanisms, the heads 38 and 38a of which are shown. The levers 54 and 55 rotate about a pivot pin 56 which is secured in the block 23. The levers extend obliquely upward from the pin 56 to a point slightly above the block 23 and then flatten out and extend almost horizontally to positions beyond the center of the cam and below the notches 51 and 52. Rotation of cam 50 is limited in either direction because the levers are stopped by the block 23 after they have depressed the tops of their respective heads below the top of the block. If, for example, the cam 50 should be rotated counter-clockwise so that the upper wall of the notch 52 presses down upon the lever 54, the lever will be depressed and, in turn, will depress the head 38a. Thus, liquid flavor will be able to flow into a cup located below the nozzle 46 and the outlet tube 49. Similarly, depression of the lever 55 will result in a flow of the carbonated water. It should be realized that the cam 50, like the cam 15, is rotated about a horizontal axis, such as the pivot pin 18.

Figure 10:
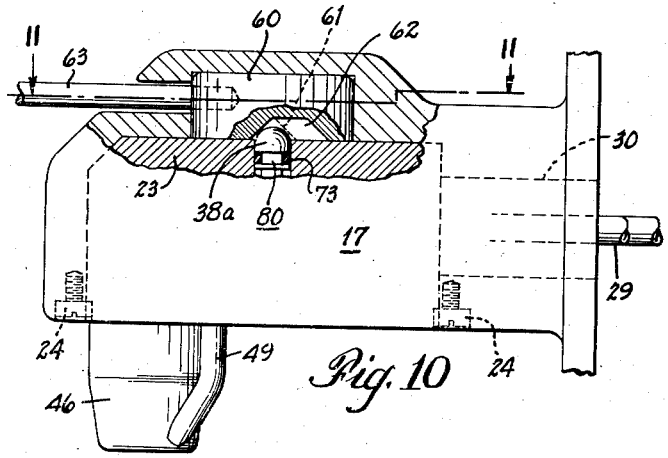
Fig. 10 is a side view taken partly in cross-section of a third cam and the plunger mechanism upon which the cam operates.
Figure 12:
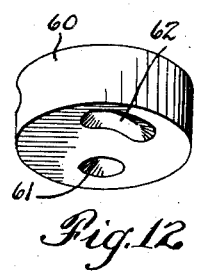
Fig. 12 is a perspective view of the cam shown in Figs. 10 and 11.
Figure 11:
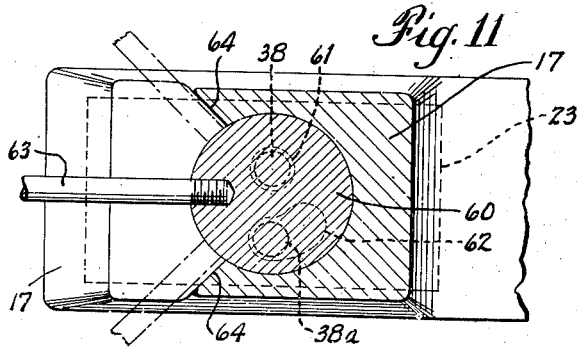
Fig. 11 is a cross-sectional plan view of the device shown in Fig. 11 taken across the line 11—11 of Fig. 10 and illustrates in further detail the cam structure of Fig. 10.

Figs. 10, 11 and 12 show a third embodiment of a cam structure which performs the same functions as the cam structures described above, but which differs from them in that it rotates in a horizontal plane. Like the previously described cams, the cam 60 has, in general, a cylindrical form but the cross-sectional circles lie in a horizontal plane rather than in a vertical plane. A conical recess 61 extends upwardly from the bottom of the cam. The position of this recess determines whether or not the carbonated water will flow. When the head 38 fits into the recess, flow of carbonated water is blocked; however, rotation of the cam in either direction causes the recess 61 to move away from the head 38 and the head to be depressed. A second recess 62 is also located in the bottom of the cam, but this recess is extended in one direction so that when the cam is rotated in that direction, the head 38a will still fit into the recess. Rotation of the cam in the opposite direction, however, will cause the head 38a to be depressed and the liquid flavor to flow. The relative positions of the recesses 61 and 62 may be seen more clearly in Fig. 11. In order to rotate the cam 60 about a vertical axis, a handle 63 is fastened to the side of the cam rather than to the top, as in the embodiments previously described. Rotation of the cam is blocked after a limited movement to either side of its central position when the handle 63 strikes the walls 64 on either side of the central position.

The invention in its broader aspects is not limited to the specific mechanisms shown and described but departures may be made therefrom, within the scope of the accompanying claims, without departing from the principles of the invention and without sacrificing its chief advantages.

What I claim is:

1. A beverage dispensing spigot comprising, in combination, a housing for stationary mounting, having a recess therein opening toward the underneath side thereof, a valve body removably secured in said recess, said body having a plurality of separate fluid conduits therethrough said conduits having inlet openings at a lateral side of said body and outlet openings at the underneath side of said body, a valve seat in each said conduit, a valve member in each conduit adapted to engage the valve seat thereof and upwardly spring pressed against said seat, said housing having a second recess therein opening toward the upper side thereof communicating with said first recess, each said valve member having a portion extending upwardly beyond the upper side of said valve body and into said second recess, and a cylindrical cam element mounted for limited rotation in said second recess having individual cam faces to engage respective ones of said upwardly extending portions of said valve members, said second recess being formed to closely engage said cam element.

2. A beverage dispensing spigot as set forth in claim 1 wherein each said valve member is positioned in a vertical bore in said valve body having an opening at the underside of said body through which said valve member may be removed, a spring in each said bore beneath a valve member, a threaded cap in each said bore at the underside of said valve body retaining said springs and valve members in assembled position, and a metering screw for each said conduit adjustable from the underneath side of said valve body, said threaded caps and metering screws being substantially laterally displaced from the outlet openings of said conduits.

3. A beverage dispensing spigot as set forth in claim 1 wherein said cylindrical cam element is rotatable about a horizontal axis and removable from said second recess at the upper side of said housing, said element having flattened portions in the cylindrical wall thereof to engage said valve members.

4. A beverage dispensing spigot as set forth in claim 1 wherein said cylindrical cam element is rotatable about a horizontal axis and has cam portions in the cylindrical wall thereof to engage levers pivotally mounted on said housing each said lever engaging a respective one of said valve members.

5. A beverage dispensing spigot as set forth in claim 1 wherein the cam faces of said cylindrical cam element are so formed that rotation of said element in one direction will depress one only of said valve members and rotation of said element in the opposite direction will depress a plurality of said valve members.

WILLIAM V. KING.

REFERENCES CITED

The following references are of record in the file of this patent:

UNITED STATES PATENTS

| Number | Name | Date |
| --- | --- | --- |
| 1,619,278 | Travis | Mar. 1, 1927 |
| 2,323,947 | Van Der Werff | July 13, 1943 |
| 2,476,519 | Van Der Werff | July 19, 1949 |
| 2,488,949 | Walsh | Nov. 22, 1949 |